United States Patent
Soogoor

(10) Patent No.: US 7,383,252 B2
(45) Date of Patent: Jun. 3, 2008

(54) ADVANCED SEARCH ALGORITHM WITH INTEGRATED BUSINESS INTELLIGENCE

(76) Inventor: Srikanth P. Soogoor, 604 W. Lookout Dr., #126, Richardson, TX (US) 75080

( * ) Notice: Subject to any disclaimer, the term of this patent is extended or adjusted under 35 U.S.C. 154(b) by 420 days.

(21) Appl. No.: 10/899,982

(22) Filed: Jul. 27, 2004

(65) Prior Publication Data

US 2006/0026131 A1 Feb. 2, 2006

Related U.S. Application Data

(63) Continuation-in-part of application No. 10/899,694, filed on Jul. 27, 2004.

(51) Int. Cl.
*G06F 17/30* (2006.01)
(52) U.S. Cl. .......................... 707/3; 707/5; 707/104.1; 705/1; 705/39; 705/40
(58) Field of Classification Search .................. 707/3
See application file for complete search history.

(56) References Cited

U.S. PATENT DOCUMENTS

| | | | |
|---|---|---|---|
| 5,008,882 A * | 4/1991 | Peterson et al. ............ 370/406 |
| 5,170,393 A * | 12/1992 | Peterson et al. ............ 370/255 |
| 6,101,420 A * | 8/2000 | VanDoren et al. ............ 700/5 |
| 6,892,169 B1 * | 5/2005 | Campbell et al. ............ 703/1 |
| 2001/0037465 A1 * | 11/2001 | Hart et al. .................... 713/201 |
| 2002/0087522 A1 * | 7/2002 | MacGregor et al. ........... 707/3 |
| 2003/0158839 A1 * | 8/2003 | Faybishenko et al. ......... 707/3 |
| 2004/0143570 A1 * | 7/2004 | Klock et al. .................... 707/3 |

* cited by examiner

Primary Examiner—Wilson Lee
Assistant Examiner—Binh V Ho
(74) Attorney, Agent, or Firm—Michael Diaz

(57) ABSTRACT

The present invention is a business intelligence within an adaptive searching system. The searching system uses a business intelligence engine for communicating with a corporate database associated with a business enterprise and a consumer. The business intelligence engine compiles data about the consumer and any transaction conducted by the consumer with the business enterprise. A transaction monitor for monitors the transactions conducted by the consumer with the business enterprise. Rules are determined by a business process and rules engine derived from the data. The business intelligence engine analyzes the data to provide a personalized communication message to the consumer.

11 Claims, 7 Drawing Sheets

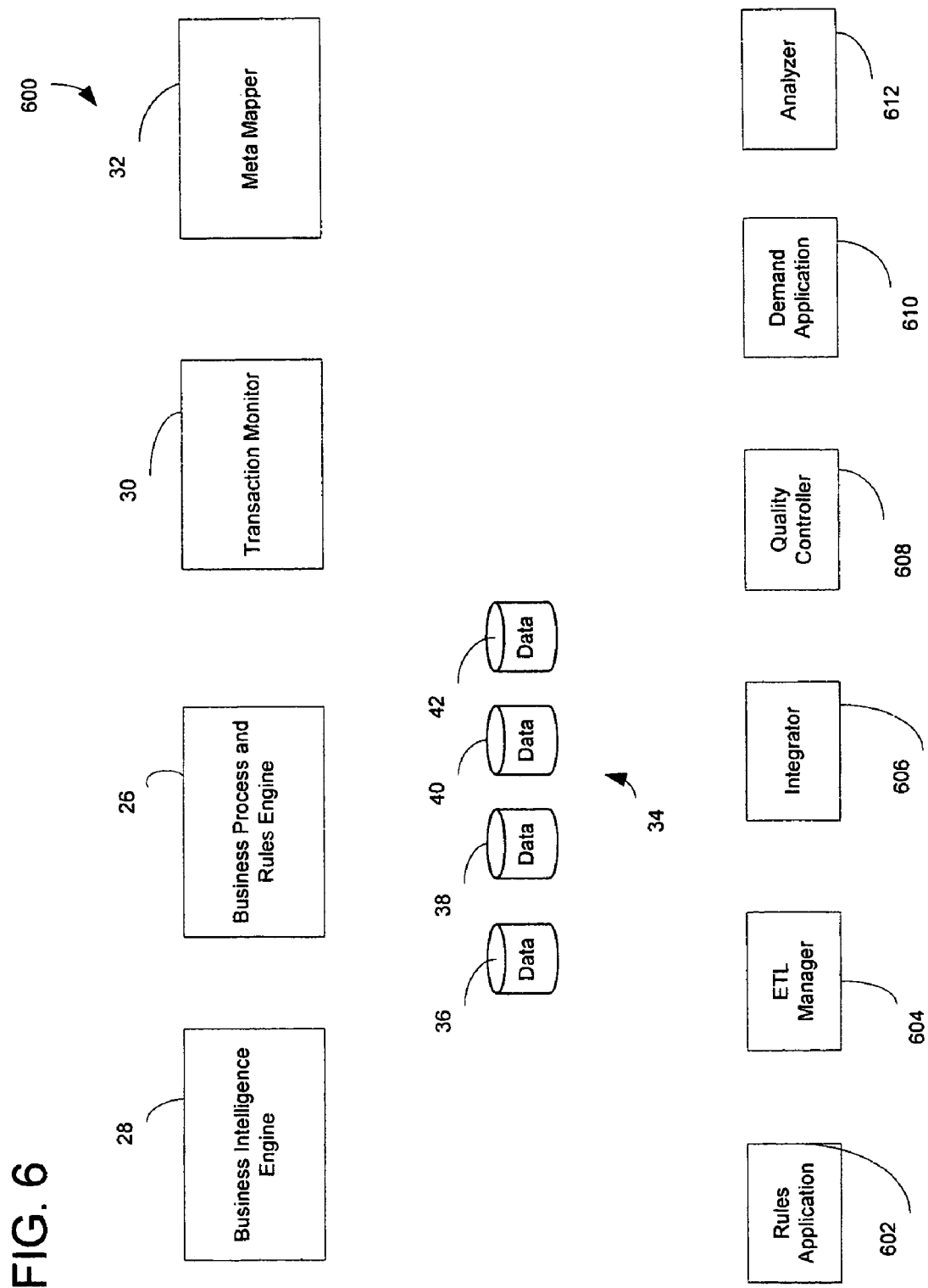

ADVANCED SEARCH ALGORITHM WITH INTEGRATED BUSINESS INTELLIGENCE

RELATED APPLICATIONS

This application is a continuation-in-part of a co-pending U.S. patent application Ser. No. 10/899,694 Srik Soogoor entitled "Hypercube Topology Based Advanced Search Algorithm," filed Jul. 27, 2004 and is hereby incorporated in its entirety by reference herein.

BACKGROUND OF THE INVENTION

1. Field of the Invention

This invention relates to search services. Specifically, the present invention relates to an advanced search algorithm utilizing business intelligence.

2. Description of the Related Art

Although advances have been made in search services provided over the Internet, there has been a lack of capability in processing both structured and unstructured data. Applicant's co-pending application (serial number unassigned-"Soogoor I") discloses an advanced search algorithm using a novel hypercube architecture. The searching algorithm provides a heuristic approach whereby message passing ants search a hypercube architecture in response to a search query. An advanced business intelligence is needed which provides the capability of integrating corporate databases with the enhanced new searching algorithm within a hypercube topology environment of Soogoor.

Thus, it would be a distinct advantage to have a searching algorithm integrated with a business intelligence to provide a variety of services to a consumer and a business enterprise. It is an object of the present invention to provide such a system and method.

SUMMARY OF THE INVENTION

In one aspect, the present invention is a business intelligence within an adaptive searching system. The business intelligence includes a business intelligence engine for communicating with a corporate database associated with a business enterprise and a consumer. The business intelligence engine compiles data about the consumer and any transaction conducted by the consumer with the business enterprise. A transaction monitor monitors the transactions conducted by the consumer with the business enterprise. In addition, the business intelligence includes a business process and rules engine providing specified rules associated with the data obtained. The business intelligence engine analyzes the data to provide a communication message to the consumer personalized to the consumer.

In another aspect, the present invention is a method of integrating a business intelligence with a search algorithm. The method begins by obtaining preferences of a consumer conducting transactions with a business enterprise. Next, the transactions are monitored between the consumer and business enterprise. The preferences and the transactions of the consumer are then analyzed. A communication plan tailored to the consumer based on the analysis of the preferences and transactions of the consumer is created and implemented with the consumer.

In still another aspect, the present invention is a searching algorithm integrated with a business intelligence. The algorithm includes a search engine for receiving and processing search queries. The search engine utilizes an adaptive search algorithm. An interface device communicates with the search engine. The interface device provides a communication link between a consumer providing a search query to the search engine. A plurality of data sources are queried. At least one of the data sources is a corporate data source associated with a business enterprise. The search algorithm has an index of the plurality of data sources. The search engine utilizes a plurality of message passing ants. Each message passing ant searches the indexed plurality of data sources to answer the search query and deposits a signal of a path traversed, thereby allowing other message passing ants to follow the path taken by a previous message passing ant. In addition, a business intelligence engine is utilized for communicating with the corporate data source associated with the business enterprise and the consumer. The business intelligence engine compiles data about the consumer and any transaction conducted by the consumer with the corporate data source. A transaction monitor monitors the transactions conducted by the consumer with the business enterprise. A business process and rules engine provides specified rules associated with the data obtained. The business intelligence engine analyzes the data to provide a response to a search query message to the consumer personalized to the consumer.

BRIEF DESCRIPTION OF THE DRAWINGS

FIG. 5 is a flow chart outlining the steps for conducting the adaptive search algorithm according to the teachings of the present invention; and FIG. 6 illustrates a simplified block diagram of the components of a business intelligence platform utilized in the system in the preferred embodiment of the present invention.

DESCRIPTION OF THE INVENTION

Figure 1:
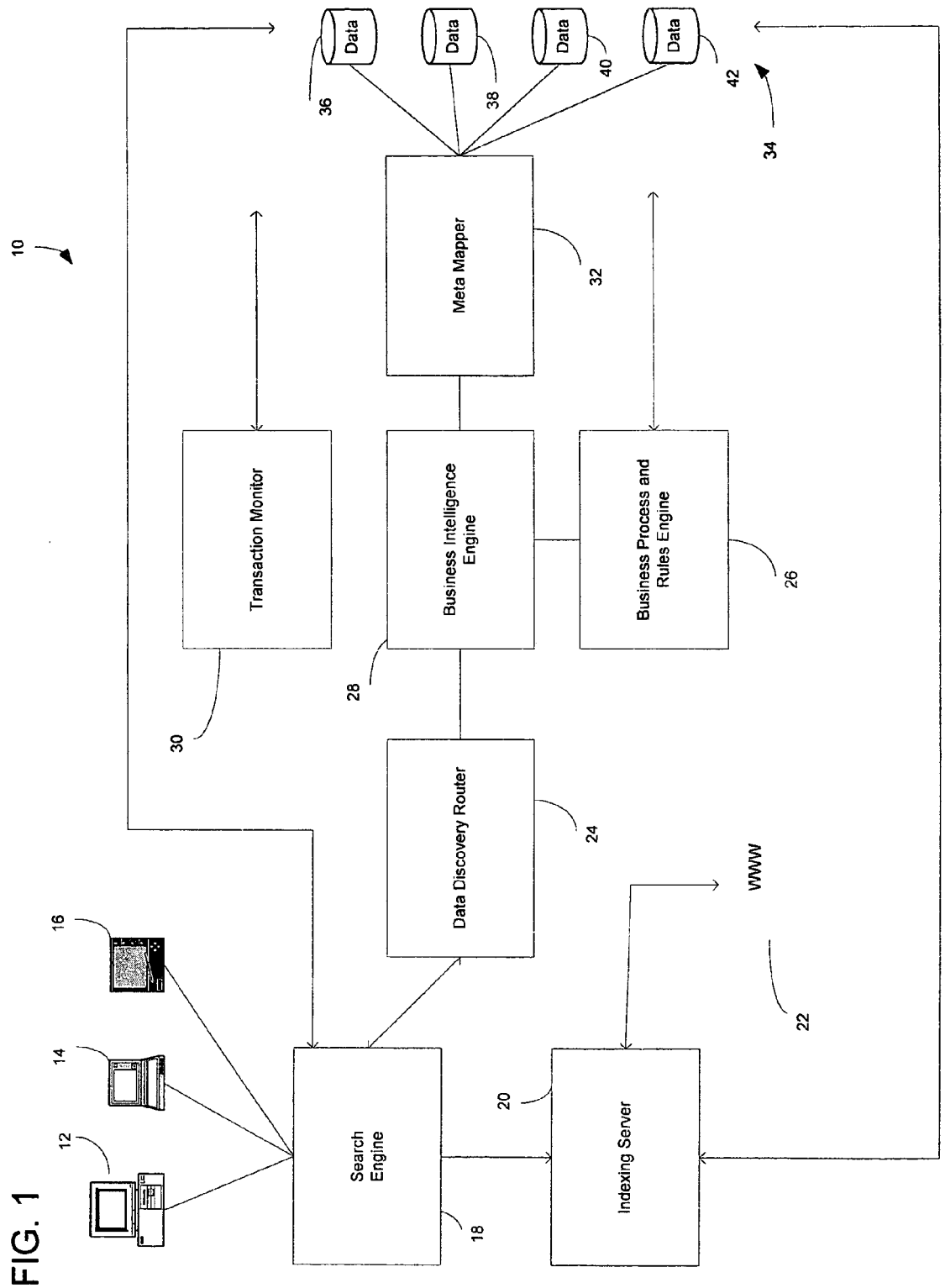
FIG. 1 is a simplified block diagram of a web service system in the preferred embodiment of the present invention.

An adaptive search algorithm integrated with a business intelligence is disclosed. FIG. 1 is a simplified block diagram of a web service system 10 in the preferred embodiment of the present invention. The system includes a plurality of interface devices 12, 14, and 16. The interface devices may be any computing or communication device communicating in the system 10. The interface devices may be mobile phones, personal data assistants (pda's), laptops, computers, etc. The interface devices are operated by consumers or users of the system 10. Within the system 10 is a search engine 18 and an indexing server 20. The system 10 incorporates the World Wide Web (Internet) 22 with the other components of the system. In addition, the system includes a data discovery router 24, a business process and rules engine 26, a business intelligence engine 28, a transaction monitor 30 and a meta mapper 32. A corporate database group 34 comprises a plurality of corporate databases 36, 38, 40, and 42. The various components of the system 10 may reside in one or more computing systems, such as servers or other computer workstations. Additionally, some or all of the components may include a computer processor and memory as needed to perform the functions within the system 10. Preferably, the business intelligence engine, business process and rules engine, the transaction monitor and the meta mapper all are associated with a specific business enterprise running one or more corporate databases. The corporate databases preferably reside at a site separate from the search engine, indexing server and data discovery router. Alternatively, the corporate databases may reside with one or more of the other components of the system 10. The transaction monitor provides a monitoring function between any message sent or received from the corporate nodes (databases). The meta mapper provides a virtual database of all the corporate databases associated with a specific business enterprise.

The search engine is the gateway for all searching requests from the users of the interface devices 12, 14, and 16 to the system 10. In the preferred embodiment of the present invention, the interface devices are embedded within their computing systems with a search engine footprint. When a user logs in with the system 10 for the first time, a web service request is activated and ready to make a request. Preferably, the search engine footprint is a program occupying a small amount of memory within each interface device's computing system. The search engine footprint may include memory holding user preferences to assist in the searching requests of the user.

When a search request is made by a user through the interface device, a web service request is sent to the data discovery router 24 via the search engine 18. The data discover router 24 determines where the web service request needs to be routed, such as the Internet 22, the corporate databases 36, 28, 40, 42, or other sources. Once the data discovery router determines where to send the web service request, a number of background queries are generated and sent. The primary query for the web service request is the source that most closely matches the data discovery router's determination.

In the event that the data discovery router's recommendation is to a corporate database, then the business intelligence engine 28 is activated. The business intelligence engine processes the requests based on the business process and rules engine 26's configuration and rules setup. For example, the business process and rules engine may provide rules for a plurality of consumers. A consumer may be provided with a special discount if the consumer spent a specified amount of money in the previous year. The business intelligence engine is a platform that takes the output of the business process and rules engine and presents the necessary solution for use in the search engine and processing the search requests.

The search engine 18 is adaptive and utilizes a novel concept known as an ant colony optimization algorithm. The search engine optionally adapts itself to the user's profile. However, a profile setup is not mandatory for a user to use the system. In the preferred embodiment of the present invention, the user's preferences are provided in initial setup through the search engine footprint of the user's interface device.

The search engine is preferably located with a computer server well known in the art. However, the search engine may be located in any computing system allowing communication through the system 10. The search engine includes a capability to perform a generic search, a personal search, a corporate database search and receipt of sponsored advertisements.

Figure 2:
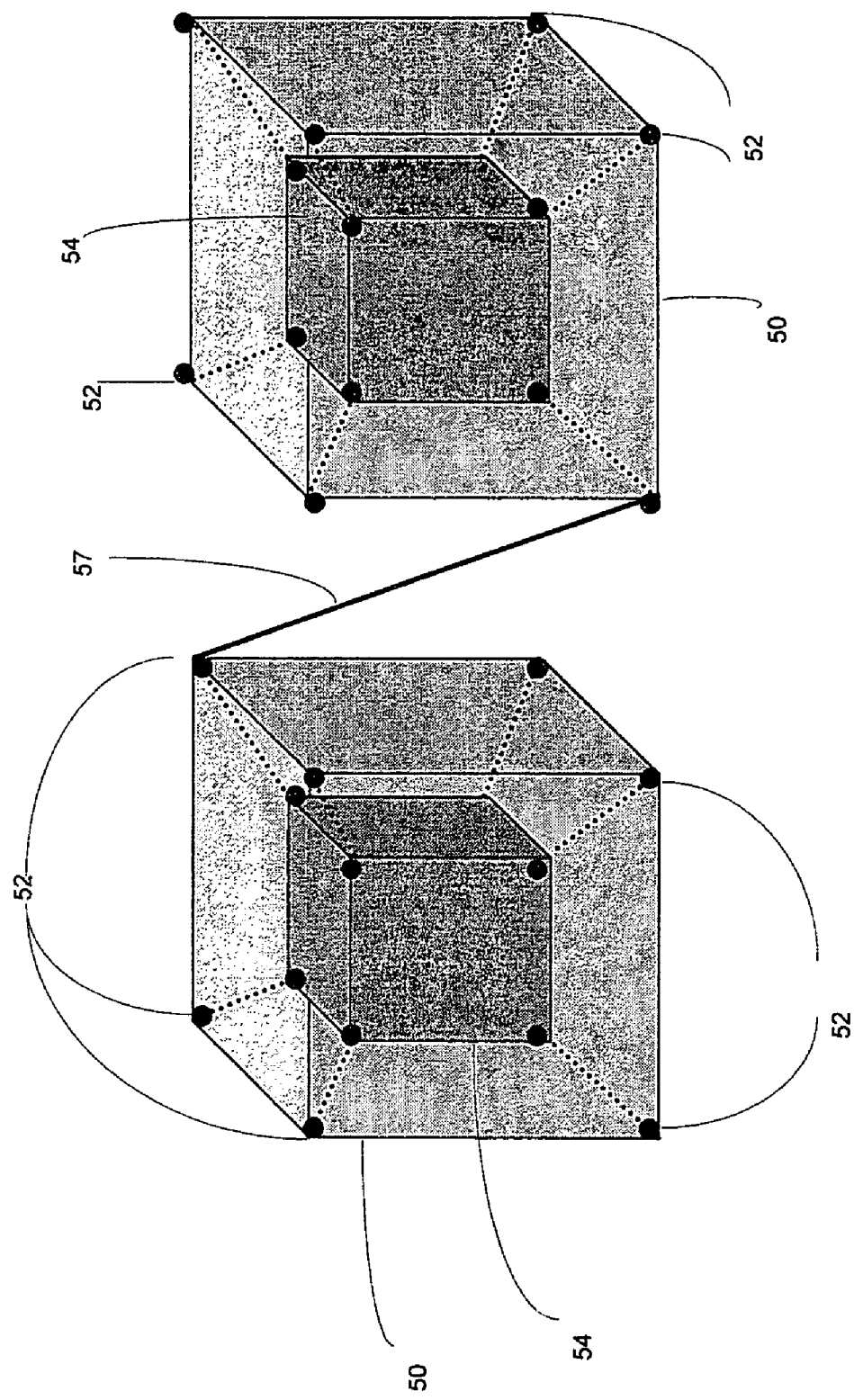
FIG. 2 illustrates a topology of a hypercube used for indexing data on the various nodes of the system in the preferred embodiment of the present invention.

In order to facilitate the enhanced searching capabilities of the search engine 18, a novel architecture is utilized. The search engine uses web crawler bots to traverse the web to create an index of all the websites. This indexing is performed prior to any search request. These websites under meta data are grouped in a n-layered hypercube topology with the longest distance between any two points being no more than log(n) base 2 nodes. FIG. 2 illustrates a topology of a cube 50 surrounding a cube 54 used for indexing data on the various nodes of the system (e.g., servers) according to the teachings of the present invention. As the web crawlers traverse the Internet, more daisy chained hypercubes topology may be built (see FIG. 3). Vertices 52 ("point or node") of the hypercube 50 represent an indexed search data point. The data points or data sources may be web pages, meta data or a combination of both. Lines depicted between the data points show pathways. One node from one cube is connected by a pathway 57 in an adjacent cube. The indexing server 20 preferably operates using the Linux operating system and use Intel processors. However, any processor and operating system may be used. The indexing server provides an index of all the data sources found by the web crawler bots.

A hypercube is a cube with more than three dimensions. A single ($2^0=1$) point (or "node") may be considered as a zero dimensional cube, two ($2^1$) nodes joined by a line (or "edge") form a one-dimensional cube, four ($2^2$) nodes arranged in a square form a two dimensional cube and eight ($2^3$) nodes form an ordinary three dimensional cube. Following this geometric progression, the first hypercube has $2^4=16$ nodes and is a four dimensional shape (a "four-cube"). An N dimensional cube has $2^N$ nodes (an "N-cube"). To make an N+1 dimensional cube, two N dimensional cubes are joined at each node on one cube to the corresponding node on the other cube. A four-cube may be visualized as a three-cube with a smaller three-cube centered inside it with edges radiating diagonally out (in the fourth dimension) from each node on the inner cube to the corresponding node on the outer cube.

Each node in an N dimensional cube is directly connected to N other nodes (e.g., pathway 57). Each node may be identified by a set of N Cartesian coordinates where each coordinate is either zero or one. Two nodes are directly connected if they differ in only one coordinate.

The simple, regular geometrical structure and the close relationship between the coordinate system and binary numbers make the hypercube an appropriate topology for a parallel computer interconnection network. The fact that the number of directly connected, "nearest neighbor", nodes increases with the total size of the network is also highly desirable for a parallel computation. The proximity of the data points is defined during the mapping process by specifying, through the indexing server 20, indexing definitions. The definitions define the proximity of the information found.

Figure 3:
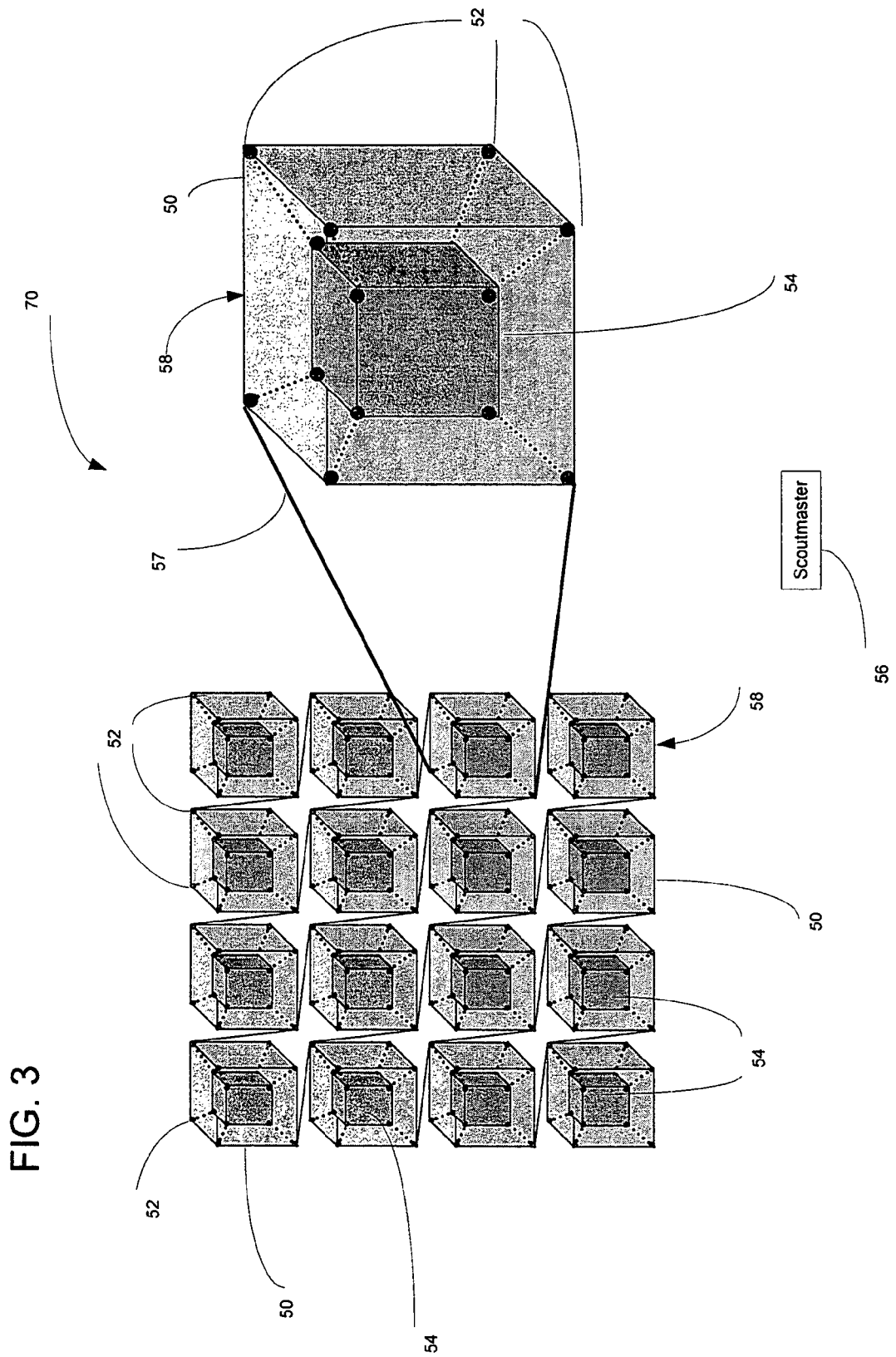
FIG. 3 depicts a 4-layered 4-cube hypercube topology in the preferred embodiment of the present invention.

FIG. 3 depicts a 4-layered 4-cube hypercube topology in the preferred embodiment of the present invention. FIG. 3 illustrates a hypercube architecture 70 having a plurality of cubes 50 and 52. The hypercube architecture is fully distributed and utilizes Message Passing Interface (MPI). MPI is implemented by use of "ant colony optimizations." Ant colony optimization is an evolution-based search technique for the solution of difficult combinatorial problems. The ant colony optimization follows the analogy of ants, which leave a pheromone trail. It should be understood that the layers of cubes as well as the number of cubes may vary depending on the search and amount of data sources available.

These ants, unlike the web crawlers, possess the MPI and are known as Mespa's (message passing ants). The Mespas use memory to store partial solutions. The Mespas live in a discrete world, which provides for independent operation of each Mespa with an awareness of other Mespas. The Mespas have heuristic information and may perform a local search. Additional, the Mespas have a limited intelligence allowing a look ahead capability. The Mespas follow the trails as depicted on the hypercube topology (lines between vertices 52). The Mespas deposit an analogous pheromone which is problem dependent and a function of the solution quality. The analogous pheromone is a signal deposited by each Mespa providing a trail for other Mespas to follow. As more Mespas traverse the trail, the pheromones (signals) deposited become stronger. Therefore, once a plurality of Mespas traverse a path, other Mespas will follow. This follows the analogy of a colony of ants which, at first sends a few ants to scout ahead for food. Once several ants follow a specific path to a food source, other ants follow the pheromones on the trail and are led to the food source.

The algorithm for searching within the plurality of hypercubes includes several assumptions. The algorithm assumes that there is a web crawler (Mespa) that is both scalable and incremental. The hypercubes keep a local copy of the web pages with the meta data in a repository which is eventually used for indexing, mining and personalization. Each node of the hypercube topology includes a set of information on a particular web page. These nodes of the web pages have been built using the concept of proximity cluster. The distance from one node to the next node or any other node signifies the "proximity" or "closeness" of those two web pages.

Each hypercube (or plurality of cubes) is assigned at least one web crawler (Mespa). Also a scoutmaster is utilized to determine which Mespa goes to which hypercube and start a search. The scoutmaster is ultimately responsible for the search result. A scoutmaster 56 is depicted on FIG. 3. The position and the number of scoutmasters is exemplary only and may be varied. In addition, a plurality of Mespas 58 are also depicted on FIG. 3. The Mespas traverse the paths between each node and search the various data points.

For each Mespa K, the probably of p(k, t, w) of moving from node t to node w depends on the combination of two values: the attractiveness n(t,w) on the hypercube of the move, as computed by some heuristic indicating the a priori desirability of the move and the trail level tl (t, w) on the hypercube of the move, indicating how proficient it has been in the past to make that particular move. This represents a posteriori indication of the desirability.

Trails are preferably updated when the Mespas have completed their search, increasing or decreasing the level of trails corresponding to moves that were part of "good" or "bad" search, respectively.

The algorithm includes a tabu list [L] of all the Mespas (inactive list). A randomly selected Mespa is sent to the hypercube 50 for the next search request from the tabu list. Additionally, a scoutmaster is initialized. The scoutmaster selects a hypercube for the search. The scoutmaster initializes p(k, t, w) and n(t,w). Next, the Mespas on a specific hypercube (e.g., hypercube h), perform a parallel operation. Each Mespa is responsible for a cube c. Next, the probability is determined to move into the cube c. The requested search items are searched amongst the indexed web pages. If any Mespa finds a requested item, the Mespa returns an answer to the scoutmaster. If the requested item is not found, a message is sent to the scoutmaster that the search results were negative. The scoutmaster then terminates the Mespa that failed the search. The scoutmaster is informed of this termination. The search continues within other hypercubes.

Figure 4:
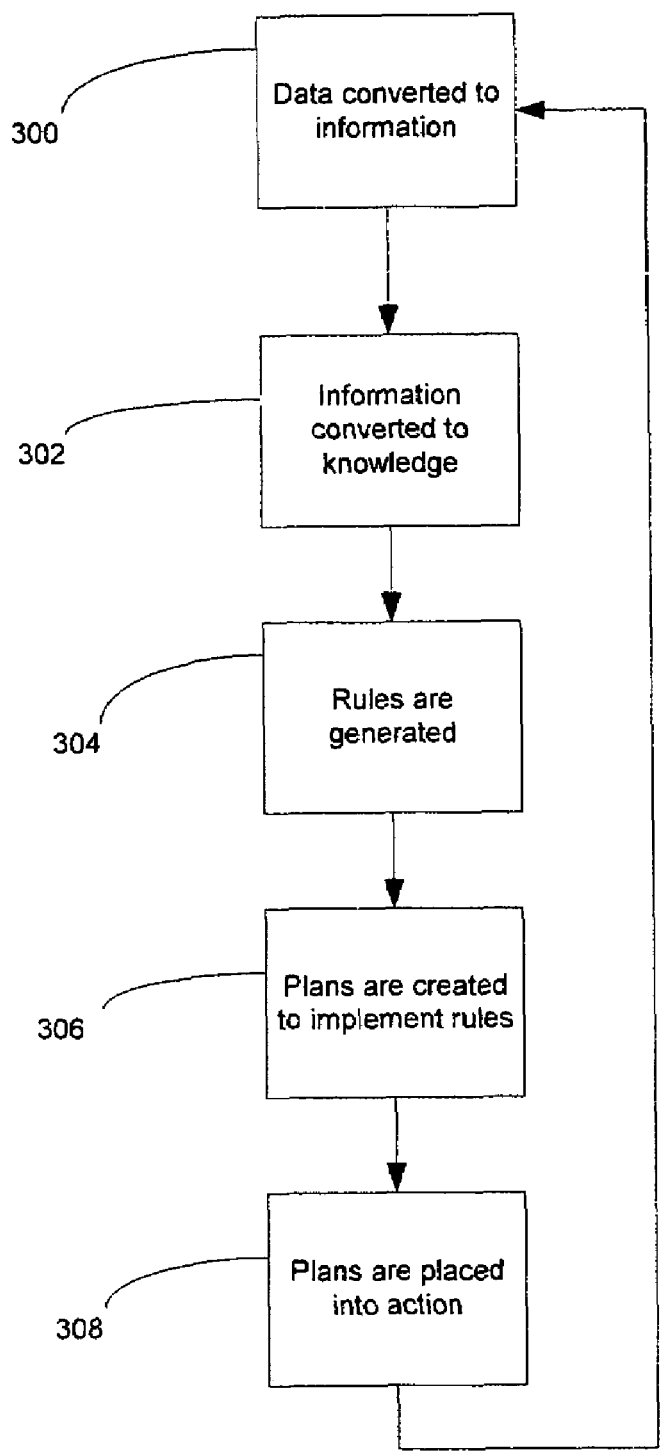
FIG. 4 is a flow chart illustrating the process by which business intelligence may be integrated into the system and the search algorithm according to the teachings of the present invention.

FIG. 4 is a flow chart illustrating the process by which business intelligence may be integrated into the system 10 and the search algorithm according to the teachings of the present invention. The process begins with step 300 where data is converted to information. In addition to performing an advanced search, data may be extracted from multiple transactions or operation systems and integrated and stored in a dedicated database (e.g., meta mapper 32). The transactions may be compiled by the transaction monitor 30. The meta mapper may be a virtual database storing information from several sources such as the corporate databases and transactions from the transaction monitor. The meta mapper may match and merge customer records from five operational systems (e.g., orders, service, sales, shipments, and loyalty programs) into a single file source. This extraction and integration process turns data into a new product, namely, information.

Next, in step 302, the information is converted into knowledge. Users or corporate enterprises, through the business intelligence engine 28, access and analyze the information located in the meta mapper. The business intelligence engine identifies trends, patterns, and exceptions. Analytical tools enable the users of the system 10 (both consumers and business enterprises) to turn information into knowledge.

The method then moves to step 304 where the knowledge is used to create rules through the business process and rules engine 26. With the knowledge gained, rules may be created from the trends and patterns observed. For example, 50 additional products may be ordered when an existing inventory falls below 25 products. In addition, forecasts may be developed from past trends and working assumptions. The rules may be highly complex and derived from statistical algorithms or modes. For example, statistically generated rules may be dynamically configured for the price of a product based on changing market conditions, optimized freight hauling schedules in a large carrier network, or determined by the best cross-sell opportunities using customer response models.

Next, in step 306, plans are created to implement the rules. For example, marketers may create campaigns that define what offers to make to which customers through various channels (e.g., direct mail or email) based on their analysis of customer segments. Additionally, models may be developed that predict how a customer responds to specific offers from the results of previous campaigns. In step 308, these plans turn knowledge and rules into action by implementing the plans.

Once, the plan is executed, the process is repeated by returning to step 300. Operational systems capture customer responses to the offers and subsequent transitions (e.g., sales). This data is then extracted by the meta mapper (data warehouse), integrated with other pertinent data, and analyzed for the effectiveness of the plans. The plans are then refined accordingly. This process is continually repeated.

The system 10, through the business intelligence engine 28, utilizes a learning cycle. In essence, to capture the data, analyze the data, set a plan reacting to the data, acting on the plan, and finally reviewing the results of the actions. Thus, the business intelligence engine uses a cycle which allows a flexible and efficient way to respond to new events in the marketplace.

Existing systems which manage and extract data, information and knowledge are very limited. Existing business intelligence models have focused merely on reporting specific and limited sets of business data which has no relationship to the end consumer of the data. The present invention uses a business intelligence which provides a learning process which includes a feedback process to continually improve on plans of action. The business intelligence performs this automatically through the components of the system 10 (i.e., business intelligence engine, business process and rules engine, transaction monitor and the meta mapper).

Figure 5A:
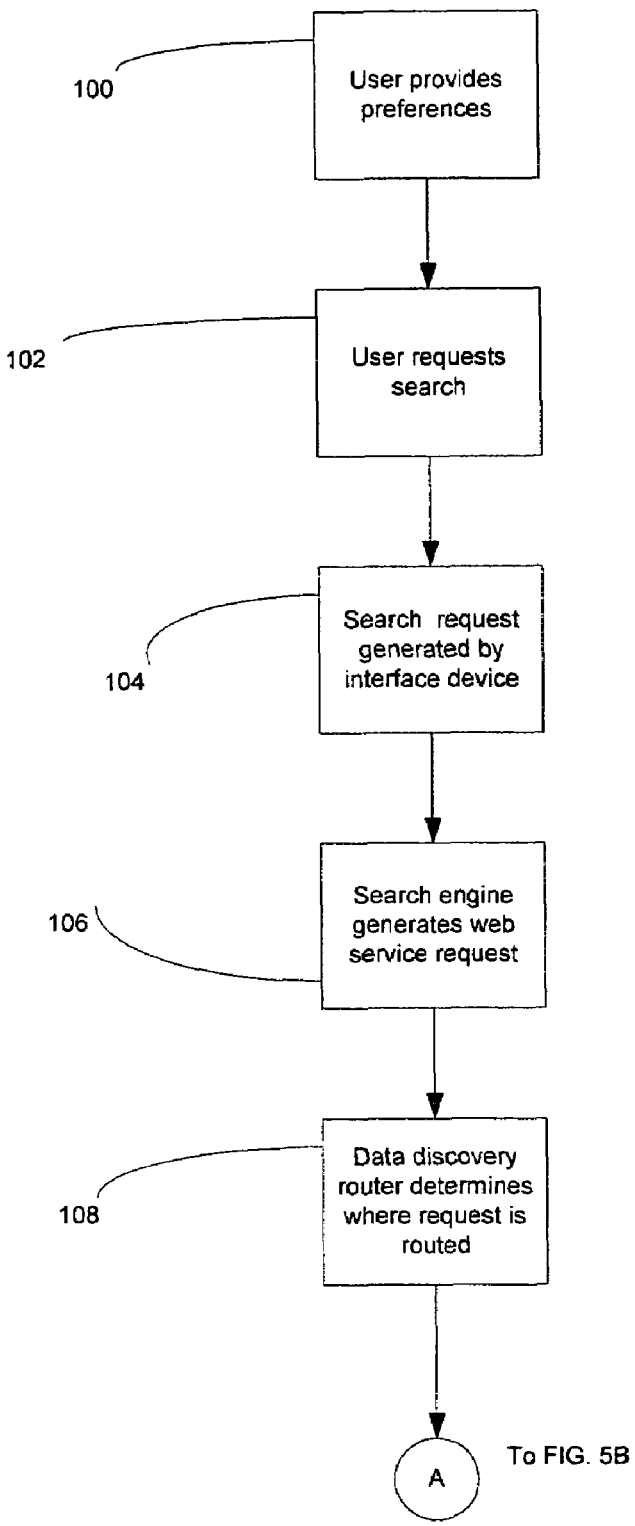
FIGS. 5A and 5B are flow charts outlining the steps for conducting a search within the system according to the teachings of the present invention.
Figure 5B:
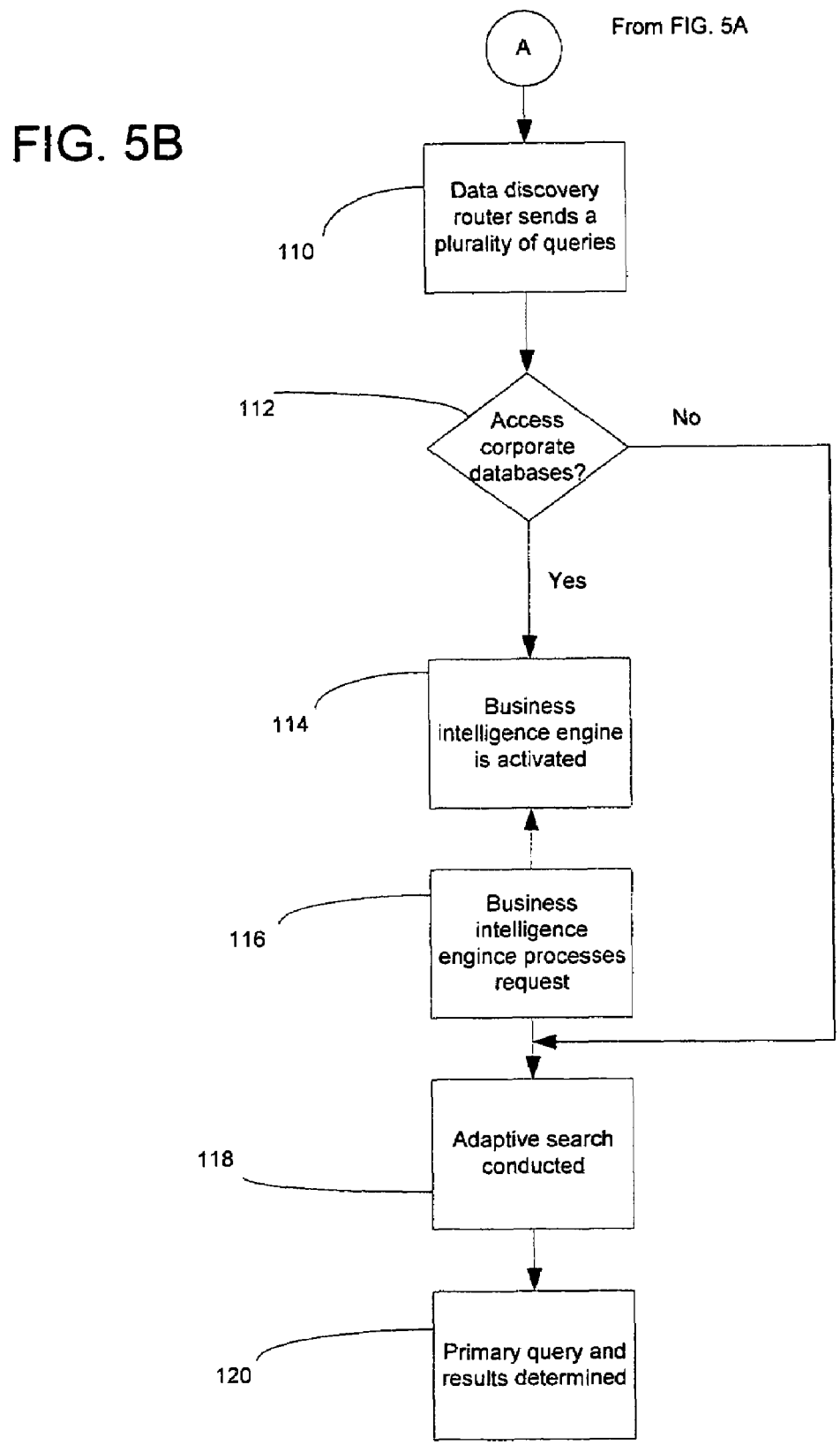

FIGS. 5A and 5B are flow charts outlining the steps for conducting a search within the system 10 according to the teachings of the present invention. With reference to FIGS. 1-3, 5A, and 5B, the steps of the method will now be explained. The method begins with step 100 where the user optionally provides preferences through the search engine footprint embedded within the interface device. The preferences may include any information, which may be helpful in performing a search, such as a user's home address, interests, buying habits, etc. Next, in step 102, the user requests a search through the interface device. The method then moves to step 104 where a request is generated from the user's interface device to the search engine 18. In step 106, the search engine generates a web service request and sends the request to the data discovery router 24. In step 108, the data discovery router determines where the request is to be routed. The data discovery router then generates and sends a plurality of queries through the system 10 in step 110.

The method then moves to step 112 where it is determined if the data discovery router recommends accessing the corporate database group 34. If it is determined that the corporate database group should be accessed, the method moves to step 114 where the business intelligence engine 28 is activated. Next, in step 116, the business intelligence engine processes the request based on the business process and rules engine 26 configuration and rules set. The business process and rules engine's configuration is setup as desired to provide specified rules and policies incorporated in the use of the corporate data group 34. The method then moves to step 118 where a search is conducted by the adaptive searching algorithm (explained below in FIG. 5).

However, if it is determined that the data discovery router does not recommend accessing the corporate database group 34, the method moves from step 112 to step 118 where the search is conducted by the adaptive searching algorithm. Next, in step 120, the primary query and results determined by the search engine is sent to the requesting user's interface device.

If the business intelligence engine 28 is activated, as discussed in step 114 of FIGS. 5A and 5B, several components of the business intelligence engine are also activated. FIG. 6 illustrates a simplified block diagram of the components of a business intelligence platform 600 utilized in the system 10 in the preferred embodiment of the present invention. The business intelligence platform includes the business intelligence engine 28, the business process and rules engine 26, the transaction monitor 30, the meta mapper 32, the corporate database group 34 and a plurality of corporate databases 36, 38, 40, and 42. Additionally, a rules application 602 may also be employed. This application assists to defining the business rules for an organization. Rules that affect a business enterprise come in many different varieties and from many different sources. Some are imposed by external sources, such as government laws and regulations. Other rules are self-imposed, such as industry business practices or polices adopted by a business enterprise or organization.

The business intelligence platform may also include an ETL manager 604. The extraction manage performs the functions of extracting, transformed and loading data. The data is extracted, cleansed and loaded before it is integrated.

Additionally, an integrator 606 is used by the business intelligence platform 600. The integrator mines the data from several disparate databases and operating platforms, such as the corporate databases 36, 38, 40, and 42. The integrator may be used to bridge the gap with intelligence integration technologies.

The business intelligence platform 600 also includes a quality controller 608. Prior to utilizing any type of mining (search) algorithm, the data should be cleansed of inconsistencies. The data quality solution enables the analysis and standardization of robust matching, reliability, adaptability and scalability necessary for the integration step.

An on demand application 610 is used to deliver the widest possible range of management reports to users (consumer or business enterprise). The on demand application may offer advanced report formats and built in report scheduling and alerts, as well as zero-client web-based delivery of presentation-ready reports.

The business intelligence platform 600 includes an analyzer 612 which is a multi-dimensional analyzer that allows users at different levels of a business enterprise's organization to apply various techniques. The impact of these techniques may be observed.

The business intelligence platform 600 may also include the metrics application (not shown) which helps organizations define goals and businesses performance measurements. The measurements are applied to defined criteria and allow individuals, team and organizations to monitor, analyze, and report at every level of the business.

The business method intelligence platform 600 may include some or all of the components described above. The system 10 will only use these components in areas where the business intelligence engine 28 is activated.

The application of the business intelligence platform 600 may be varied across various types of industries. For example, the business intelligence platform may be used to provide immediate notification of a sales order status to an executive of a business enterprise.

The utilization of the business intelligence platform is particularly effective in providing personalized information to consumers. Currently, retail customers receive very generic solicitations from stores. The solicitations may include sales announcements and special promotion information. The solicitations may be through blanket email messages, postal flyers, and telephone solicitations. Retailers certainly desire direct communication with consumer capability. But currently, no system is available which provides a personalized service to the consumer.

In addition to using generic solicitations, retailers often employ a premium customer program. These premium customer programs provide incentives to customers spending a specified amount of money. By utilizing a personalized process of presenting these solicitations to preferred customers is certainly desirably, yet not present in current systems. With the present invention, real-time sales and marketing promotions derived from the consumer's shopping preferences as well as subscriptions to particular information events may not be provided. The consumer may provide preferences within the interface device or devices. In addition, since a business enterprise is involved, the business intelligence platform is activated. Previous buying transactions stored in the corporate databases are analyzed. As discussed above, the data is transformed into knowledge from which rules are developed and plans are generated. The plans may include marketing to specific individuals. For example, the consumer may provide preferences such as men's clothing (both casual and business wear). The consumer may prefer to shop at a specific retail store. This information is stored within the search engine footprint of the consumer. Additionally, due to the consumer's previous buying transactions, the retailer is aware that the consumer prefers specific types of shirts and shoes. This data may be transformed into a marketing campaign where the consumer is informed of a sale via the user's interface device (e.g., email or text messaging on a mobile phone).

Other examples where the business intelligence of the system 10 may be utilized is in the medical industry. Patient drug prescriptions may be refilled upon providing a reminded message to a patient. In the travel industry, a consumer may be provided a list of services, such as cheapest gas, restaurant promotional and traffic notifications. The business intelligence may also be employed within grocery stores.

Although the various components of the system 10 are depicted as separate items, such as the business search engine 28 and the business process and rules engine 26, the present invention may include components in one or more locations. Additionally, it should be understood that the hypercube architecture may or may not be employed with the business intelligence of the present invention.

The present invention provides many advantages over existing business intelligence systems. The present invention provides an adaptive process for using a user's preferences with previous transactions with specific rules and analysis developed by a particular business enterprise. The present invention allows the targeted communication to consumers in a personalized and direct manner. In addition, the business intelligence may be used in conjunction with the searching algorithm of the present invention to provide a searching capability which learns from past searches by incorporating the "ant colony optimization" techniques discussed above.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A business intelligence within an adaptive searching system, the business intelligence comprising:
    a business intelligence engine for communicating with a corporate database associated with a business enterprise and a consumer, the business intelligence engine compiling data about the consumer and any transaction conducted by the consumer with the business enterprise;
    a transaction monitor for monitoring the transactions conducted by the consumer with the business enterprise;
    a business process and rules engine providing specified rules associated with the data obtained;
    wherein the business intelligence engine analyzes the data to provide a communication message to the consumer personalized to the consumer;
    a search engine for receiving and processing search queries, the search engine utilizing an adaptive search algorithm;
    an interface device for communicating with the search engine, the interface device providing a communication link between a user providing a search query to the search engine; and
    a data source associated with the business enterprise;
    the search algorithm having an index of the plurality of data sources;
    the search engine utilizing a plurality of message passing ants, each message passing ant searching the indexed plurality of data sources to answer the search query and depositing a signal of a path traversed, thereby allowing other message passing ants to follow the path taken by a previous message passing ant in response to the signal of the path traversed by a previous message passing ant;
    whereby the business intelligence is integrated into the search engine to process data contained in the plurality of data sources.

2. The business intelligence of claim 1 wherein:
    the consumer provides a preference list to the business intelligence engine; and
    the communication message is personalized based on the preference list of the consumer.

3. The business intelligence of claim 2 wherein the communication message is personalized based on the transactions conducted by the consumer with the business enterprise.

4. The business intelligence of claim 2 wherein the business process and rules engine creates a rule based on transactions conducted by the consumer and the preference list of the consumer.

5. The business intelligence of claim 1 wherein the process and rules engine creates a rule based on transactions conducted by a plurality of consumers and the business enterprise.

6. The business intelligence of claim 1 wherein the search algorithm indexes the plurality of data sources by forming the data sources into a hypercube topology, the hypercube topology including a plurality of cubes associated with one or more data source, whereby data sources are arranged in proximity to other data sources based upon a similarity of the information possessed by the data source.

7. A method of integrating a business intelligence with a search algorithm, the method comprising the steps of:
    obtaining preferences of a consumer conducting transactions with a business enterprise;
    monitoring transactions conducted between the consumer and business enterprise;
    analyzing the preferences and the transactions of the consumer;
    creating a communication plan tailored to the consumer based on the analysis of the preferences and transactions of the consumer;

implementing the communication plan with the consumer;

indexing a plurality of data sources, one of the data sources being associated with the business enterprise;

sending a search query to a search engine by the consumer;

sending a plurality of message passing ants to the data sources searching an answer to the search query;

depositing a signal by a first message passing ant to indicate a path traversed by the message passing ant during the search;

determining by a second message passing ant the path taken by the first message passing ant in search of an answer to the search query;

following, in response to the signal of the path traversed by a previous message passing ant, by the second message passing ant, the path of the first message passing ant to answer the search query; and providing a response to the search query by at least one message passing ant searching the plurality of data sources, the response integrated with the communication from the business intelligence engine to the consumer.

8. The method of integrating a business intelligence of claim 7 wherein the communication is a solicitation to the consumer.

9. The method of integrating a business intelligence of claim 7 wherein the step of analyzing the preferences and the transactions of the consumer includes analyzing transactions conducted between a plurality of consumers and the business enterprise.

10. The method of integrating a business intelligence of claim 9 wherein the step of indexing the plurality of data sources includes arranging the data sources into a hypercube topology wherein each data source is positioned in proximity to another data source based on the similarity of information possessed by each data source.

11. A searching algorithm integrated with a business intelligence to form a system, the system comprising:

a search engine for receiving and processing search queries, the search engine utilizing an adaptive search algorithm;

an interface device for communicating with the search engine, the interface device providing a communication link between a consumer providing a search query to the search engine;

a plurality of data sources, at least one of the data sources being a corporate data source associated with business enterprise;

the search algorithm having an index of the plurality of data sources;

the search engine utilizing a plurality of message passing ants, each message passing ant searching the indexed plurality of data sources to answer the search query and depositing a signal of a path traversed, thereby allowing other message passing ants to follow, in response to the signal of the path traversed by a previous message passing ant, the path taken by a previous message passing ant;

a business intelligence engine for communicating with the corporate data source associated with the business enterprise and the consumer, the business intelligence engine compiling data about the consumer and any transaction conducted by the consumer with the corporate data source;

a transaction monitor for monitoring the transactions conducted by the consumer with the business enterprise; and a business process and rules engine providing specified rules associated with the data obtained;

whereby the business intelligence engine analyzes the data to provide a response to a search query message to the consumer personalized to the consumer.

* * * * *